Oct. 28, 1941.  H. DE MARTIS ET AL  2,261,053
ELECTRODE FOR SECONDARY BATTERIES
Filed June 26, 1939   2 Sheets-Sheet 1
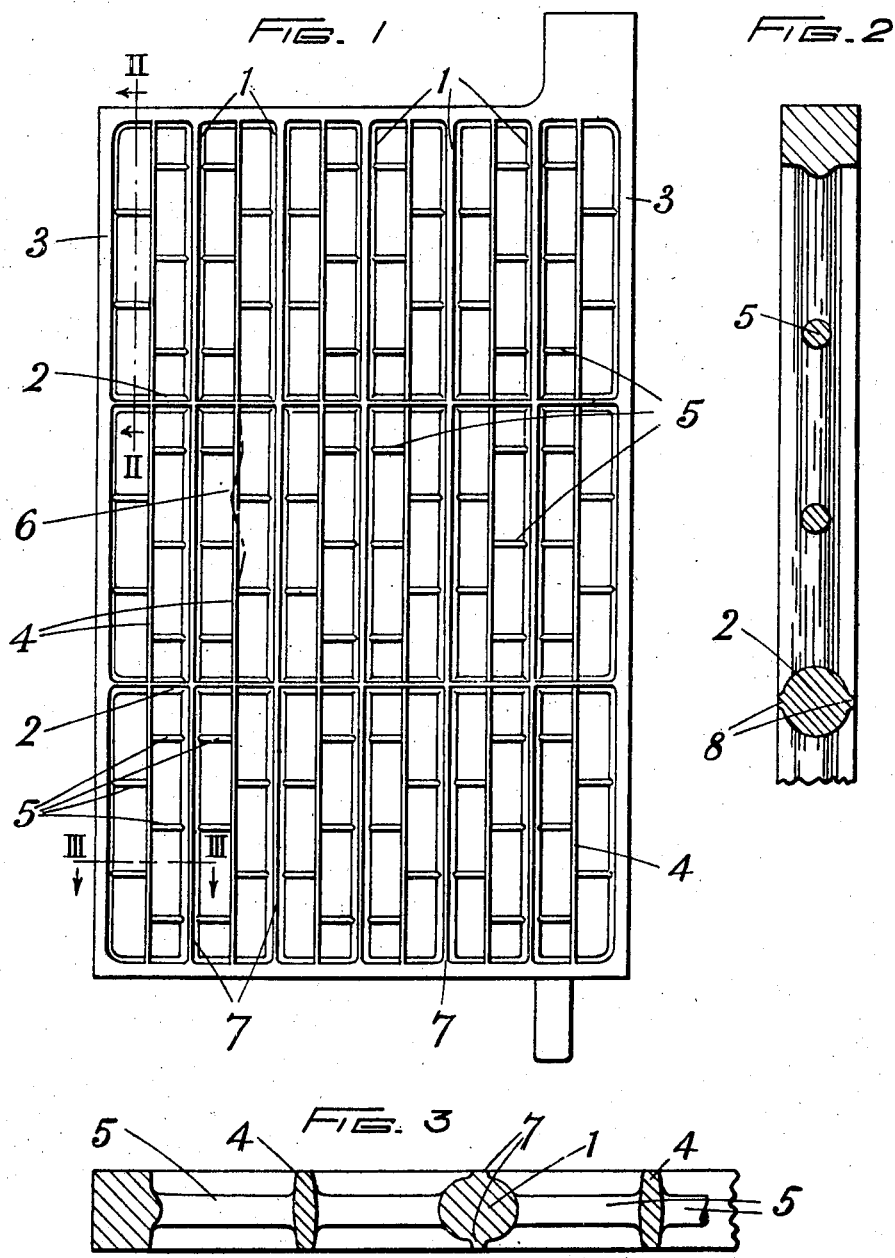
Inventors
Horace de Martis
Sydney J. Clark
by
Attorney

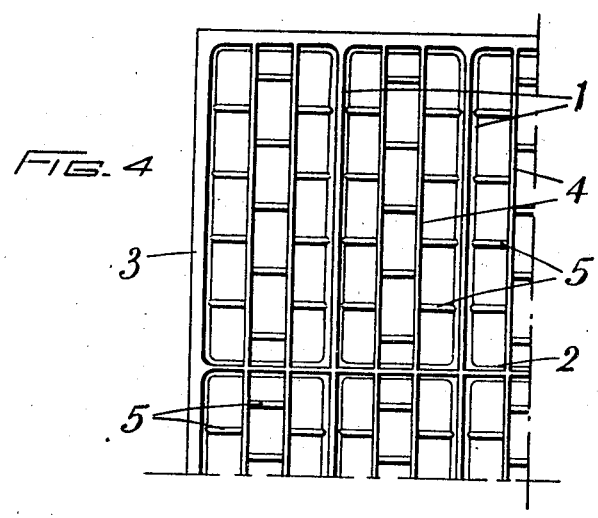
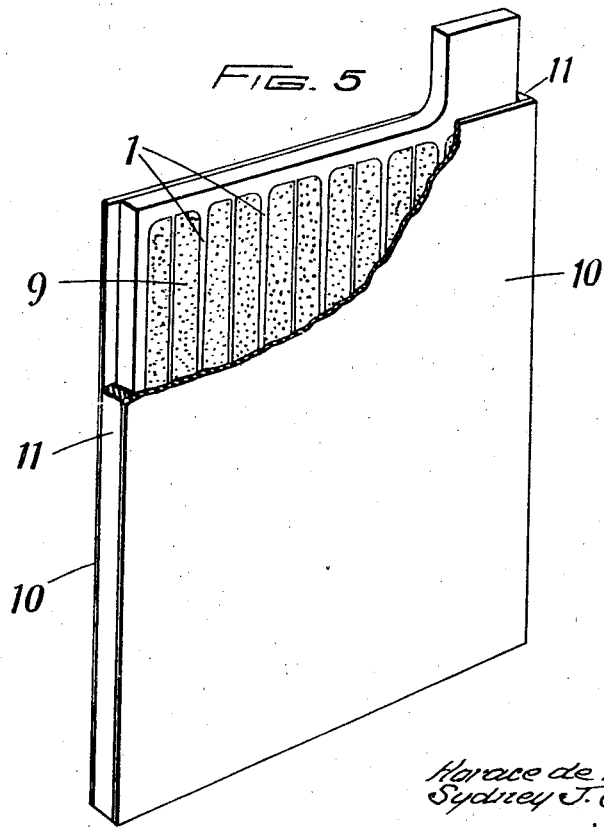

Patented Oct. 28, 1941

2,261,053

UNITED STATES PATENT OFFICE 2,261,053

ELECTRODE FOR SECONDARY BATTERIES

Horace De Martis and Sydney James Clark, New Malden, England

Application June 26, 1939, Serial No. 281,242 In Great Britain June 29, 1938

1 Claim. (Cl. 136—37)

It is well known that in designing the lead grids for the positive electrodes of a lead-acid battery the efforts of all inventors were concentrated on obtaining an adequate collector and distributor of current which would at the same time support and retain the active material. For this purpose, bearing in mind that the ampere-hour capacity of the electrode is proportional to the amount of active material it contains, a variety of combinations of thin vertical, horizontal or diagonal strands have been devised, with the object of obtaining an alveolate construction which would prevent the fall of the active material.

The numerous strands that such construction implies are subjected, when in the cell, to destructive electrolytic action, the lead is attacked by Planté formation, peroxidises and in time totally disappears. The object for which the grids were originally created that is, to retain the active material, is thus defeated and the life of the cell comes to an end.

To retard this destructive electrochemical action and to prevent the deformation of the grid when attacked by Planté formation and also to prevent the deformation of the grid when subjected to the stresses caused by the expansion of the active material during the cycle of charge and discharge, alloys of lead and antimony and/or other metals have been used. The ductility having been thus greatly minimised by these alloys the metal under the stresses caused by peroxidation and expansion of the material becomes crystalline. The lead-antimony strands are still subject to a certain amount of elongation and they now fracture creating an interruption of continuity in the strands and frame of the grids, thus shortening the life of the electrodes even before the grid has been totally peroxidised.

Our experiments now show that when special protective means for separations are used the alveolate construction mentioned above becomes totally unnecessary and a grid acting as a collector and distributor of current composed of a few sturdy vertical bars is sufficient. The object of the present invention is to provide a grid which when used with so-called protected electrodes, will appreciably increase the life of the battery without disturbing its ampere-hour capacity by altering the grid/active material ratio.

By transferring the weight of the horizontal strands to the longitudinal strands or bars these become much stronger so that the drawbacks mentioned above will be either obviated or greatly minimised.

For several reasons however, the main drawback being the shrinkage that occurs during the cementation of the lead-oxide paste when applied to the grid, it is advisable to provide a certain amount of keying by means of a few horizontal, vertical, or diagonal strands or a combination of them suitably disposed.

This is done to facilitate the handling of the plates during the various processes of manufacture and better to distribute the current amidst the unformed active material thus facilitating and accelerating its transformation into lead peroxide. As soon as the active material has been transformed into peroxide the horizontal strands are useless so they are designed as thin as possible and preferably staggered in such a way as to prevent deformation of the frame of the plates caused by any possible elongation of the thin strands.

The invention will now be described with reference to the accompanying drawings wherein:

Fig. 1 is a face view of one form of grid constructed in accordance with the invention.

Fig. 2 is a section on the line II—II of the said grid;

Fig. 3 a section on the line III—III thereof;

Fig. 4 is a face view of a segment of a slightly modified form of grid constructed in accordance with the invention; and Fig. 5 is a perspective view of a protected electrode battery unit comprising the grid according to Figs. 1, 2 and 3, a paste filling and an envelope.

The grid illustrated in Figs. 1, 2 and 3 in accordance with the invention comprises sturdy longitudinal bars 1 and reinforcing horizontal bars 2 inside the frame 3, the bars 1 being considerably stouter than the strands employed in conventional or previously proposed grids. The improved grid so far described comprises, therefore, a number of stout elements which when in a finished plate in a battery provide good collectors and distributors of current.

As previously stated keying and conducting means is desirable during the initial stages or life of the plate. For this purpose thin longitudinal strands 4 are interposed between the bars 2 and between the said bars and the top and bottom members of the frame 3, and thin transverse strands 5 are introduced between the side members of the frame and the adjacent longitudinal strands 4 and between the said longitudinal strands and the bars 1. The points where the strands 5 join the strands 4 are staggered on opposite sides of the strands 4. The strands 5 are co-planar and their central plane coincides with the central plane of the grid.

Now, in the improved grid when charged with paste and in use stresses caused by the elongation of the strands 4, of the staggered strands 5 and the stresses caused by local expansions of the active material are taken up by deformation or breaking of the said strands 4, the weakness of the strands 4 compared with the considerably greater strength of the bars 2 and the frame causing the said strands in expanding along their length to buckle as indicated at 6 or to break. It will thus be clear that the main elements of the present grid do not deform at all or to any appreciably detrimental extent owing to certain internally produced stresses. As the stresses are taken up by the strands 4 the said stresses are not transmitted to the main sturdy bars 1 and to the frame 3 so they will prevent, or minimise, the deformation of the grid as a whole in the longitudinal and/or horizontal sense, thus preventing any possibility of fracture of these main sturdy bars or of the main outside frame of the grid.

The main collectors of the current, the vertical bars, and also the strengthening horizontal bars, can be of any shape or cross-sectional area but it is advisable to have them of a total depth of cross-section less than the thickness of the plate so that they remain buried in the active material.

The preferred cross section is shown in Figs. 2 and 3, the main body of the bars 1 and 2 being substantially elliptical in cross section, the minor axis being less than the overall thickness of the grid, and ribs or projections 7 and 8 extend from the bars 1 and 2, respectively, to the faces of the grid but the surfaces extending to the plate surfaces should present a minimum of lead surface to the electrolytic action.

It is not essential to employ bars 2.

It may be mentioned at this point that as, in effect, the main part of the material forming the horizontal strands of known grids has been transferred to vertical strands the said vertical strands which, with reference to the present invention are called bars, have now a greater cross section and thus provide greater resistance to the destructive action of peroxidation. The life of the electrodes will be thus proportionately greater without having disturbed their ampere-hour capacity as the lead:lead oxide ratio has remained substantially constant.

The construction illustrated in Fig. 4 is, in principle, like that already described with reference to Figs. 1, 2 and 3 but whereas the grid of Fig. 1 has one vertical strand between every two successive bars and between the vertical sides of the frame and the succeeding vertical bar the grid part illustrated in Fig. 4 has two vertical strands.

In Fig. 5 the battery unit comprises the electrode having a grid as described with reference to Figs. 1, 2 and 3 filled with paste indicated by 9 and an envelope formed of two side sheets 10 of material permeable to electrolyte and united marginally by strip as 11.

Although certain longitudinal and transverse strands are shown and described in Figs. 1 to 4 it will be understood that any suitable arrangement or combination of horizontal, vertical or diagonal strands may be employed.

What we claim is:

A lead grid comprising a grid frame, main strand bars arranged between the longitudinal members of the frame and extending longitudinally of such frame, additional strands extending longitudinally of the frame intermediate the main strands, with such additional strands being of less sectional area and strength than that of the main strands, and transverse strands extending oppositely from each additional strand towards the adjacent main strands, the transverse strands on opposite sides of each additional strand being in off-set staggered relation to each other.

HORACE DE MARTIS.
SYDNEY JAMES CLARK.